US011126684B2

(12) United States Patent
Sagiv et al.

(10) Patent No.: US 11,126,684 B2
(45) Date of Patent: Sep. 21, 2021

(54) PROVIDING DYNAMIC OVERVIEW PANEL USER EXPERIENCE

(71) Applicant: SAP Portals Israel Ltd., Ra'anana (IL)

(72) Inventors: Itay Sagiv, Hadera (IL); Ioannis Grammatikakis, Maxdorf (DE); Dan Watters, Cupertino, CA (US); Nicole Pompejus, Karlsdorf (DE); Stefan Kusterer, Malsch (AT); Rachel Kahana Samet, Kfar Saba (IL); Aviad Gilady, Kerem Ben Shemen (IL); Ran Gross, Rosh-Haain (IL); Yotam Kadishay, Tel Aviv (IL)

(73) Assignee: SAP Portals Israel Ltd., Ra'anana (IL)

( * ) Notice: Subject to any disclaimer, the term of this patent is extended or adjusted under 35 U.S.C. 154(b) by 234 days.

(21) Appl. No.: 15/465,227

(22) Filed: Mar. 21, 2017

(65) Prior Publication Data
US 2018/0276309 A1    Sep. 27, 2018

(51) Int. Cl.
| | | |
|---|---|---|
| *G06F 16/00* | (2019.01) | |
| *G06F 16/957* | (2019.01) | |
| *G06F 16/9535* | (2019.01) | |
| *G06F 40/131* | (2020.01) | |
| *G06F 40/186* | (2020.01) | |
| *G06F 40/205* | (2020.01) | |

(52) U.S. Cl.
CPC ...... *G06F 16/9577* (2019.01); *G06F 16/9535* (2019.01); *G06F 40/131* (2020.01); *G06F 40/186* (2020.01); *G06F 40/205* (2020.01)

(58) Field of Classification Search
CPC .. G06F 16/9577; G06F 17/212; G06F 3/0482; G06F 16/217; G06F 16/248; G06F 16/283; G06F 16/285; G06F 3/0486; G06F 8/38; G06F 9/451; G06F 16/9535; G06F 40/131; G06F 40/186; G06F 40/205
USPC .......................... 707/600–899; 715/200–978
See application file for complete search history.

(56) References Cited

U.S. PATENT DOCUMENTS

| | | | | |
|---|---|---|---|---|
| 7,840,896 | B2* | 11/2010 | Tien ...................... | G06Q 10/10 715/243 |
| 8,751,958 | B2* | 6/2014 | Mudge .................. | G06F 16/972 715/790 |
| 9,372,856 | B2* | 6/2016 | MacDonald .......... | G06F 16/283 |
| 9,509,650 | B2* | 11/2016 | Puranik .................. | H04L 51/16 |
| 10,621,552 | B1* | 4/2020 | Syed ...................... | G06Q 10/103 |
| 2007/0220004 | A1* | 9/2007 | Fifield ................. | G06F 21/6227 |
| 2009/0100367 | A1* | 4/2009 | Dargahi ................. | G06Q 10/00 715/769 |
| 2013/0152007 | A1* | 6/2013 | Costenaro ............. | G06F 3/0481 715/779 |

(Continued)

*Primary Examiner* — Michelle N Owyang
(74) *Attorney, Agent, or Firm* — Sterne, Kessler, Goldstein & Fox P.L.L.C.

(57) ABSTRACT

Disclosed herein are system, method, and computer program product embodiments for generating an overview panel that includes content received from data sources. An embodiment operates by a computer implemented method that includes determining the user, the user's role, and/or domains associated with the user in order to determine the content and/or data sources from which content should be received. The method further includes parsing the content from the data sources associated with the user, the user's role, and/or domains and generating cards to display the content from the data sources in a unified and cohesive manner.

20 Claims, 10 Drawing Sheets

(56) References Cited

U.S. PATENT DOCUMENTS

| | | | | |
|---|---|---|---|---|
| 2013/0219176 A1* | 8/2013 | Akella | ................ | H04L 63/0435 |
| | | | | 713/165 |
| 2014/0282261 A1* | 9/2014 | Ranz | .................... | G06F 3/0482 |
| | | | | 715/838 |
| 2015/0105878 A1* | 4/2015 | Jones | .................. | G06F 9/44505 |
| | | | | 700/83 |
| 2015/0381544 A1* | 12/2015 | Geva | .................... | G06Q 10/107 |
| | | | | 715/752 |
| 2017/0039255 A1* | 2/2017 | Raj | ........................ | G06Q 10/06 |

* cited by examiner

PROVIDING DYNAMIC OVERVIEW PANEL USER EXPERIENCE

BACKGROUND

Accomplishing tasks in today's business enterprise environments is becoming more complicated and challenging for users within the enterprise. Such tasks generally involve the generation, storage, and processing of ever-increasing amounts of data from ever-increasing numbers of sources of data. Business enterprises may include these different sources of data that are distributed across different business domains within the enterprise. This complexity is further compounded for users who have one or more roles or are involved in one or more domains of the business enterprise. Furthermore, users employ a wide variety of devices having varying display sizes and capabilities.

Accordingly, in such environments, tasks, such as analyzing data, reviewing the data, and making decisions based on the data, are complicated by the sheer volume of data available to users within the business enterprise and the roles/domains to which users are involved. As a result, users in today's business enterprise environments face a daunting challenge in accessing and reviewing the magnitude of available data in an organized and efficient manner.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for retrieving content from multiple data sources based on a user, user's role, and/or domains and dynamically generating overview panels comprising the retrieved content in a unified and cohesive manner.

Figure 1A:
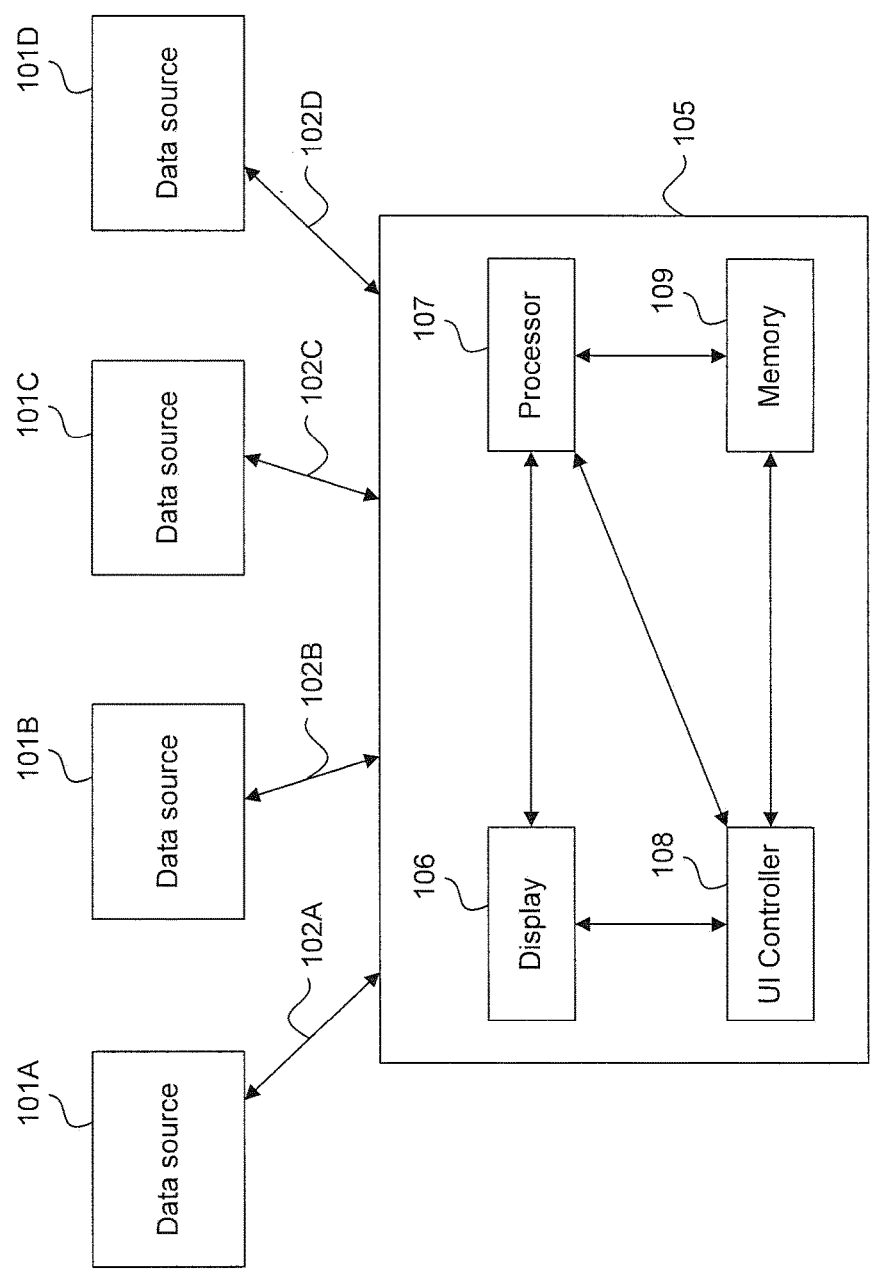
FIGS. 1A-1B are illustrations of an exemplary distributed system, according to some embodiments.

FIG. 1A is an illustration of an exemplary distributed system 100 in which embodiments described herein can be implemented. In some embodiments, distributed system 100 includes a client device 105 that may be communicatively coupled to data sources 101A-101D through wired and/or wireless connections 102A-102D, respectively. The number of data sources illustrated in FIG. 1 are merely exemplary and are not intended to limit the embodiment. The number of data sources may be any amount without departing from the scope of this disclosure. Client device 105 can be any type of computing device having one or more processors 107, one or more memories 109, a user input (for example, a touch-screen, mouse, QWERTY keyboard, microphone, or a T9 keyboard) (not shown), and a wired and/or wireless communications infrastructure capable of receiving and transmitting data over a network. As a non-limiting example, computing device 105 can include, but is not limited to, a mobile phone or other mobile device, a personal digital assistant (PDA), a computer, a cluster of computers, a set-top box, a smart watch, a smart phone, a tablet, or other types of device capable of processing instructions and receiving and transmitting data to and from humans and other computing devices. Data sources 101A-101D may be implemented as any type of device or application that is capable of generating, collecting, and/or providing data to client device 105. For example, data sources 101A-101D may be any combination of an application installed on client device 105 or on other client devices associated with a user or users, a server, sensors and/or databases.

In some embodiments, client device 105 may include user interface (UI) controller 108 for processing data provided by data sources 101A-101D and presenting the processed data on display 106 of client device 105. Connections 102A-102D may be connections external to client device 105, internal to the client device (such as from an installed application), or any combination of external and internal connections. External connections may be implemented as network connections, where such connections may be over any network or combination of networks that can carry data communication. Such a network can include, but is not limited to, a wired (e.g., Ethernet) or a wireless (e.g., Wi-Fi, 3G, 4G, 5G, etc.) network, or a combination thereof. In addition, the network can include, but is not limited to, a local area network, medium area network, and/or wide area network such as the Internet and can support protocols and technology including, but not limited to, Internet or World Wide Web protocols and/or services. Intermediate network routers, gateways, or servers may be provided between components of distributed system 100 depending upon a particular application or environment. Internal connections may be implemented as an internal bus that connects an application installed within client device 105 to other components of client device 105.

In some embodiments, data sources 101A-101D may generate, provide, access, reference, collect, and/or store any type of data. In some embodiments, system 100 may be implemented within an enterprise environment and data sources 101A-101D may generate, provide, access, reference, collect, and/or store data associated with the enterprise environment. Such data may include, but is not limited to, business contacts, emails, project reports, project timelines, images, internal reports, flowcharts, diagrams, and graphs. In an embodiment, memory 109 is used to store data accessible by client device 105. As a non-limiting example, memory 109 may be implemented using any type of recording medium coupled to an integrated circuit that controls access to the recording medium. The recording medium can be, for example and without limitation, a semiconductor memory, a solid state memory, a memory card or thumb drive, a hard disk, or other similar type of memory or storage device. Moreover, memory 109 may be integrated within client device 105 or as a stand-alone device communicatively coupled to client device 105 via a direct connection.

As a non-limiting example, memory 109 may be implemented as an internal memory device of client device 105, a compact flash card, a secure digital (SD) flash memory card, or other similar type of memory device.

In some embodiments, client device 105 may suffer from limitations such as reduced memory capabilities when compared to any of data sources 101A-101D. Therefore, data stored at memory 109 may include, but is not limited to, a subset of data found at any of data sources 101A-101D or combinations thereof. For example, memory 109 and any of data sources 101A-101D may be implemented as relational databases. In an embodiment, the data stored at memory 109 can be synchronized with data sources 101A-101D. Additional means by which data may be provided to memory 109 or UI controller 108 would be apparent to a person skilled in the relevant art given this description.

Figure 1B:
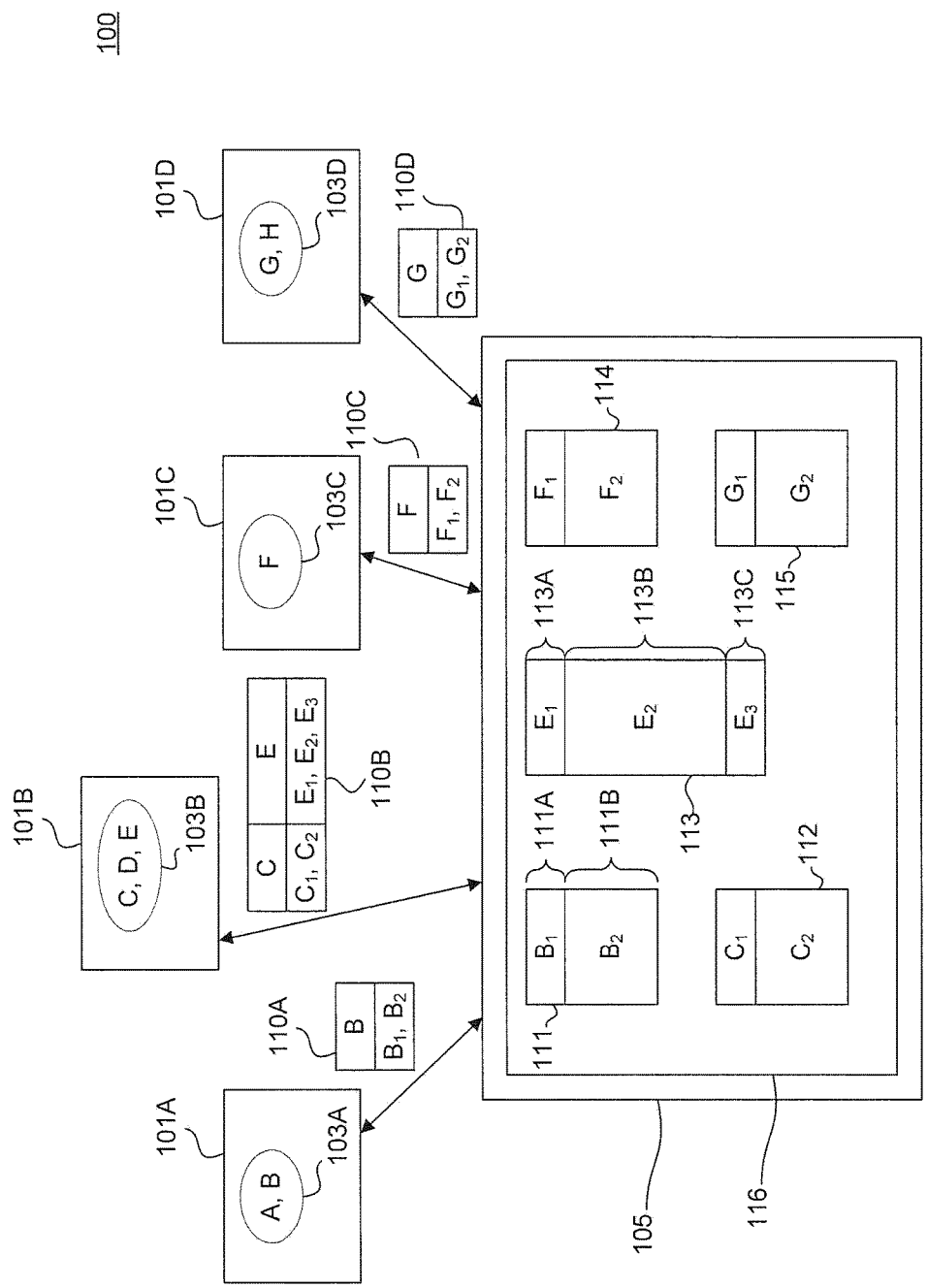

FIG. 1B is an illustration of exemplary distributed system 100 according to some embodiments of this disclosure. For ease of viewing, certain components are removed from client device 105 that were illustrated in FIG. 1A. In an embodiment, exemplary distributed system 100 is implemented within a business enterprise having one or more roles assigned to users and one or more domains associated with users. In some embodiments, the available roles and/or domains available for selection by a user of client device 105 are limited to specific domains and/or roles that are relevant to the user's duties. In other words, specific domains and/or roles are associated with permissions for accessing certain content and/or data sources. In a non-limiting example, roles may include managers, associates, or employees. The types of roles that are available for selection for generation of the overview panel are dependent on the organizational structure of the specific business enterprise. In other words, certain roles may be permitted to access certain data sources and/or content and restricted from others. Further, domains are to be understood as a broad categorization of a user's role, such as a department in which the user's role is located within the organizational structure of the business enterprise. In a non-limiting example, domains may include different departments of the business enterprise such as purchasing, financing, administrative, and payroll. These domains are merely exemplary and other types of domains are possible without departing from the scope of this disclosure. In some embodiments, the available domains may be selectable.

In a non-limiting example, data source 101A may store data 103A which may include content A and content B. Similarly, data source 101B may store data 103B which may include content C, content D, and content E, data source 101C may store data 103C which may include content F, and data source 101D may store data 103D which may include content G and content H.

Client device 105 may be associated with and/or operated by a user. As discussed above, the user may have one or more roles within an organization which are part of one or more domains. Based on the role(s) and domain(s) associated with the user, client device may generate an overview page or panel 116 customized to provide only certain data related to the user's role(s) and/or domain(s). In other words, different users will be presented with different overview panels comprising customized data related specifically to the different users' role(s) and/or domain(s). In some embodiments, role(s) and/or domain(s) are associated with certain content and/or data sources from which content should be retrieved and displayed within an overview panel. These associations may be defined by, for example, a permissions file, an access file, or any other mechanism by which role(s) and/or domain(s) may be mapped to or associated with specific content and/or data sources.

In the example embodiment illustrated in FIG. 1B, based on the particular role(s) and domain(s), the user of client device 105 may only have access to content B provided by data source 101A in message 110A, content C and content E provided by data source 101B in message 110B, content F provided by data source C in message 110C, and content G provided by content source 101D in message 110D. Content stored in data sources 101A-101D may further be considered to have sub-content that can be parsed by UI controller 108 of client device 105 for display in different areas of overview panel 116. In a non-limiting example, content B may include sub-content $B_1$ and $B_2$, content C may include sub-content $C_1$ and $C_2$, content E may include sub-content $E_1$, $E_2$, and $E_3$, content F may include sub-content $F_1$ and $F_2$, and content G may include sub-content $G_1$ and $G_2$. In some embodiments, content may also include metadata describing a type or category of the content, the relationship between sub-content, and other characteristics of content for displaying the content in a client device. In one embodiment messages 110A-110D are pushed to client device for automatically generating and/or updating overview panel 106. In other words, user of client device 105 does not need to take any action to receive updated or new data from data sources.

Client device 105 receives messages 110A-110D that includes the content associated with the user's role(s) and/or domain(s) and may be stored in memory 10. In an embodiment, UI controller 108 of client device 105 may parse the content stored in messages 110A-110D and generates overview panel 116 for displaying the content. In some embodiments, overview panel 116 may display one or more of cards 111-115. In some embodiments, cards are user interface elements that provide a collection of data or other content associated with the role(s) and/or domain(s) of a user of client device 105. In some embodiments, a user interface element is a component of a user interface, where the user interface element displays information to a user, selectable actions associated with the displayed information, and capable of receiving input from the user. For example, overview panel 116 displays content B in card 111 where sub-content $B_1$ may be displayed in a first section 111A and sub-content $B_2$ may be displayed in a second section 111B. As described above, metadata of content specifies the visual placement of sub-content within card 111; accordingly, metadata of content B may specify the placement of sub-content $B_1$ and sub-content $B_2$. Card 111 may have a defined template for displaying content and the metadata associated with content may utilize the defined template for specifying the placement of the content. As non-limiting examples, metadata may include the category of the content (e.g., chart, graph, email, etc.), title, description or summary of the content, and priority. Cards may be stored in memory 109 of client device or provided by data sources as part of messages providing content. Card 111 is discussed further with respect to FIG. 5, below.

Sections of cards may be implemented to have different functions which a user of client device 105 may use to act on displayed content. For example, section 111A may be implemented as a header of card 111 and section 111B may be implemented as a content area of card 111. Implemented as a header, section 111A may be a designated area of card 111 for providing certain types of information or specific actions related to sub-content B2 that is displayed in section 111B. In an embodiment, a header of a card may describe the content stored in a content area of the card and/or provide access to the data source from which the displayed content originated. Content area of a card may be designated as the primary area for storing content from data sources such as applications or servers. For example, as illustrated in FIG. 1B, card 111 displays sub-content $B_1$ in section 111 because it describes sub-content $B_2$ and/or provides a link to data source 101A. In some embodiments, cards comprise embedded function controls that specify the properties and formatting of data that can be displayed within its content area. Non-limiting examples of such properties are the vertical size (i.e., height of the card) and whether the size of the cards are variable or fixed. In the example of FIG. 1B, cards 112, 114, and 115 may share the same formatting and functionality as described above with respect to card 111.

In other embodiments, cards may comprise additional sections or have different formatting for displaying content. For example, cards may have an additional section as illustrated by card 113, which has sections 113A-113C. Similar to card 111, section 113A may be implemented as a header and section 113B may be implemented as a content area of card 113. However, card 113 may further include section 113C, which may be implemented as footer. Footers may be designated sections of cards located at the bottom of a card. In some embodiments, footers are sections of a card for providing contextual actions and/or additional details related to the displayed content. Actions may be dependent on the type of displayed content. For example, if the displayed content is a listing of emails, actions may include responding to a selected email, forwarding a selected email, or deleting a selected email. Other non-limiting examples include actions for interacting with the displayed content, adjusting parameters of the displayed content, forwarding the content to other users within the business enterprise, and initiating real-time communications with other users within the business enterprise. This list of possible actions is merely exemplary and other actions related to the content area possible.

In some embodiments, overview panel 116 displays cards 111-115 in a columnar format. Cards 111-115 may also share design characteristics so that the content may be displayed to the user of client device 105 in a unified and cohesive manner despite the fact that the displayed content are of different types and from a wide variety of data sources. As a non-limiting example, cards 111-115 may all have the same width but have varying heights dependent on the type of displayed content. Positioning of cards within an overview panel 116 may be modified by the user of a client device or may be automatically determined based on the type of content displayed by the cards. Moreover, cards may be prioritized over other cards based on the type of content or based on user preference. Higher priority cards may be displayed more prominently in the overview panel 116; for example, highest priority cards may be displayed on the first row of cards in the overview panel 115. Subsequent rows can be used to display cards descending order of priority.

Figure 2:
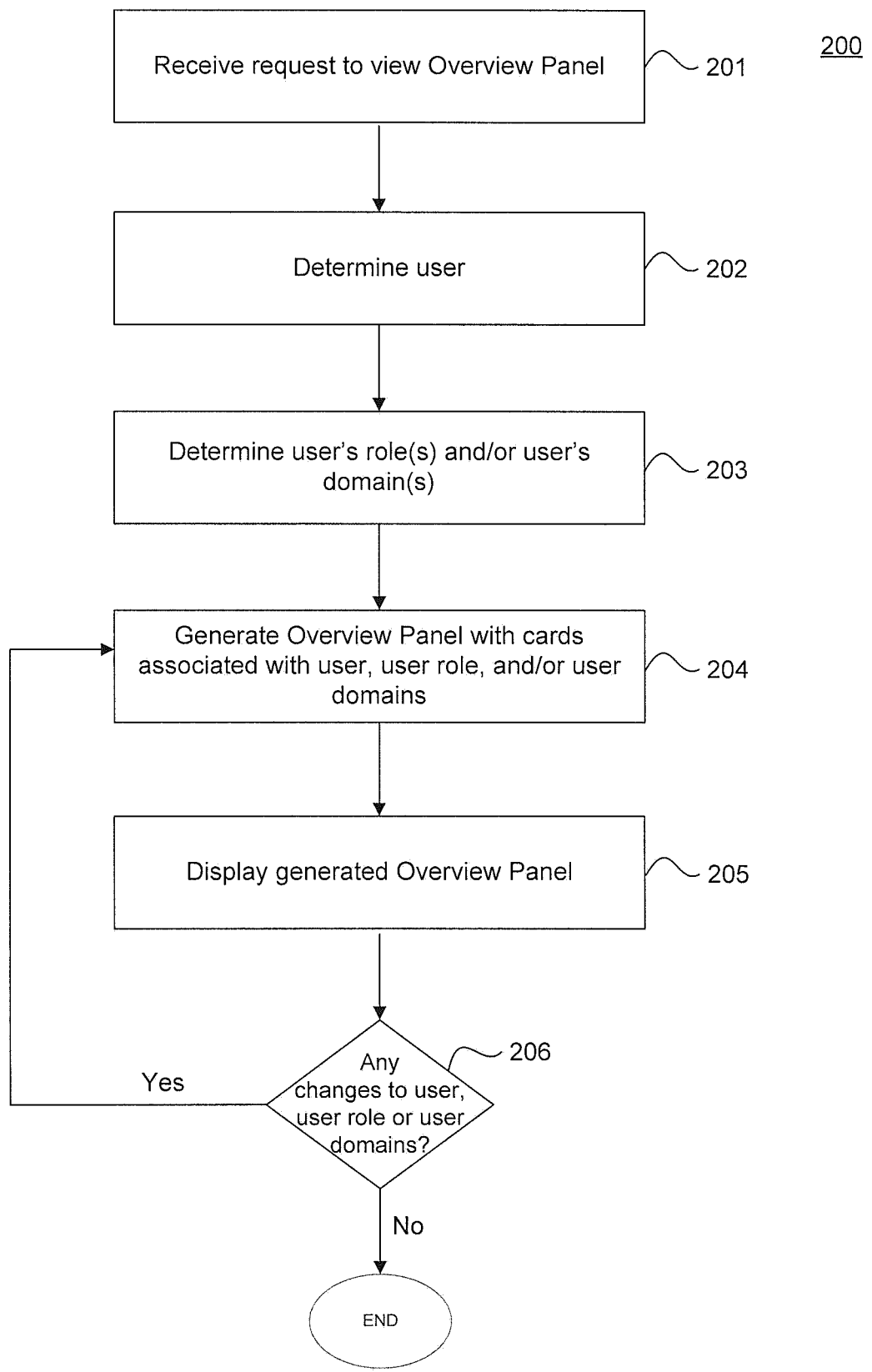
FIG. 2 is a flowchart for a method for displaying an overview panel, according to some embodiments.

FIG. 2 is a flowchart for a method 200 for displaying an overview panel, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIGS. 1A and 1B. However method 200 is not limited to these example embodiments.

In some embodiments, a client device, such as client device 105 may execute method 200. More specifically, a user interface component within the client device, such as UI controller 108 within client device 105, may be responsible for displaying and generating the overview panel. At 201, the client device receives a request to view an overview panel associated with a user of the client device. The request may be initiated by the user, such as through an input device of the client device, or may be initiated automatically by an application installed on the client device. In an embodiment, a request to view the overview panel initiates the process for generating the overview panel.

At 202, the client device determines the user associated with the request. The user may be the current user of the client device or another use associated with the client device. At 203, based on the determined user, the client device determines the role(s) and/or domain(s) associated with the determined user.

At 204, the client device may then generate the overview panel with cards containing data associated with the determined user, the user role(s), and/or the user's domain(s). The determined user, user role(s), and domain(s) have associated permissions for accessing content and/or data sources. Accordingly, determining the user, user role(s), and domain(s) informs the client device of the content and/or data sources to which the user has access and should be retrieved In another embodiment, certain role(s) and domain(s) may have required content and/or data sources to be displayed within the overview panel. For example, overview panels for all managers in a business enterprise may be required to include a card displaying schedules for their subordinates within the enterprise. The steps associated with generating the overview panel are discussed with respect to FIG. 3, below. At 205, the client device may then display the generated overview panel for viewing by a user of the client device.

The client device continues to monitor whether any updates to the overview panel are necessary. At 206, the client device determines whether there are any changes to the user associated with the request, the user's role(s), and/or the user's domain(s). For example, the user may change settings or preferences associated with the user's role(s) or domain(s) which may increase or decrease the number of data sources associate with the user. If yes, the client device generates an overview panel based on the user's new role(s) and/or domain(s). If not, method 200 ends.

Figure 3:
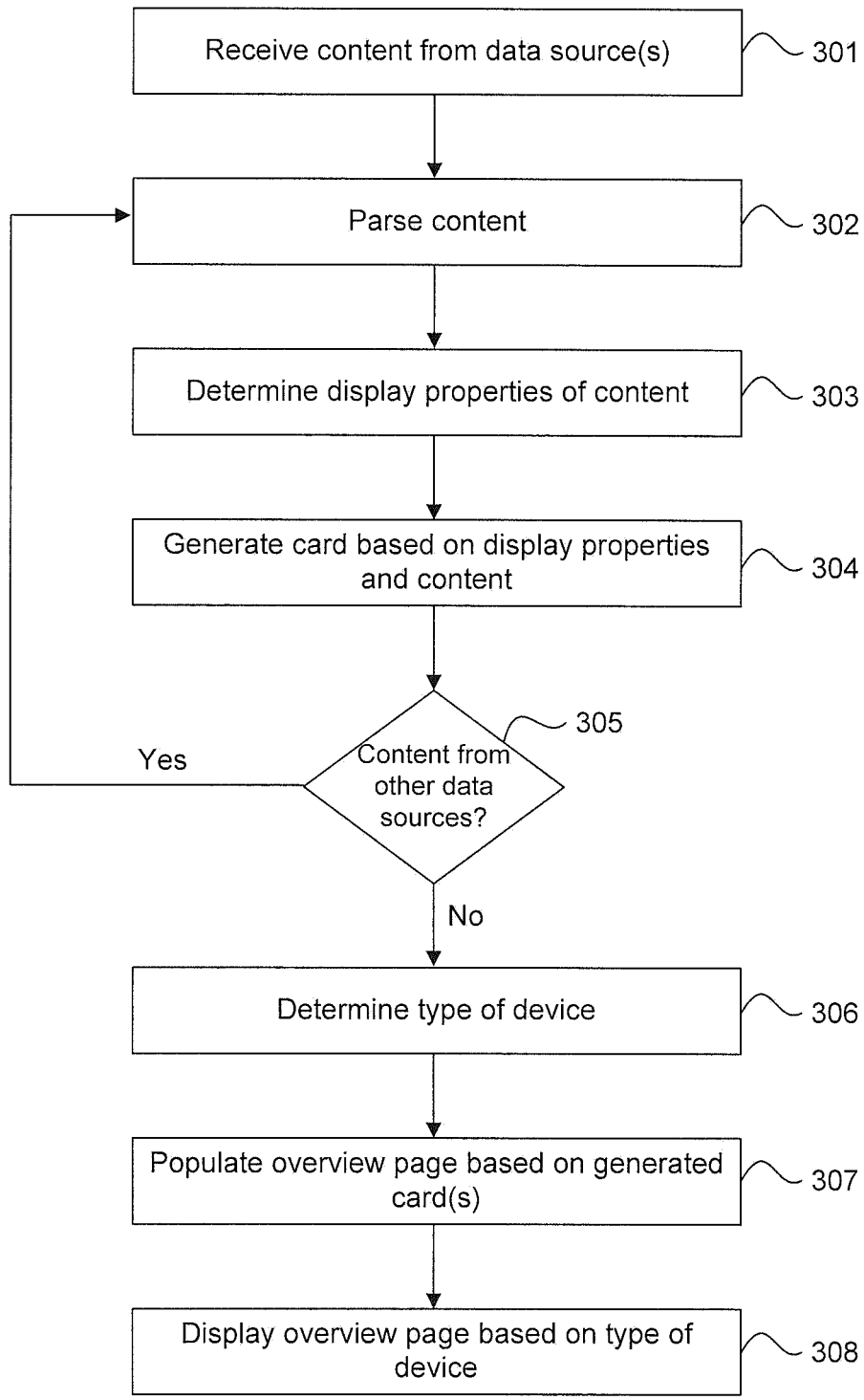
FIG. 3 is a flowchart for a method for generating and/or updating an overview panel, according to some embodiments.

FIG. 3 is a flowchart for a method 300 for generating and/or updating an overview panel, according to some embodiments. In particular, method 300 provides additional details regarding step 204 of method 200, described above, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1A-1B. However, method 300 is not limited to these example embodiments.

As with method 200, in some embodiments, a client device, such as client device 105 may execute method 300. More specifically, a user interface component within the client device, such as UI controller 108 within client device 105, may be responsible for performing steps associated with generating the overview panel. At 301, the client device receives content from the data sources associated with the user, the user's role(s), and/or the user's domain(s). Content may be pushed by data sources which obviates the need for users to refresh their respective overview panels to obtain the latest content from data sources. In some embodiments, data sources push content to client devices for generating an overview panel and/or updating an already generated overview panel. Data sources may push data, for example, when receiving a request from the client device during the process of generating a new overview panel, when data at the data sources are changed or updated, and/or at predetermined intervals. Alternatively, or additionally, client devices may also pull data from data sources. In some embodiments, pulling content may occur automatically in response to application-initiated periodic requests for content or upon request by the client device or a user interface component.

At 302, upon receiving content from the data sources, the client device may parse the received content. Parsing the content may include determining whether the received content has sub-content and/or content that is designated for specific areas of cards within the overview panel. For example, with regard to FIG. 1B, client device 105 may parse content E from data source 101C to determine that it includes sub-content $E_1$, $E_2$, and $E_3$.

At 303, the client device may further determine the appropriate display properties of the received content. In some embodiments, this may involve retrieving metadata associated with the received content where the metadata describes the display properties of its associated content. Based on the metadata, the client device may then determine the designated areas, if any, in which the sub-content should be displayed within a card, in particular, specific sections of the card. For example, client device 105 may determine, from metadata associated with content E, that sub-content $E_1$ requires display within section 113A, sub-content $E_2$ requires display within section 113B, and sub-content $E_3$ requires display within section 113C.

At 304, the client device may generate a card based on the received content and the associated display properties. At 305, the client device determines if additional content has been received for display in the overview panel, such as content from additional data sources and/or additional from the same data source. If yes, the client device may repeat 302-304, as described above, for each additional content. If not, the client device proceeds to 306 wherein the client device may determine the type of client device on which the overview panel will be displayed. Determining the type of device may include, for example, determining the physical size of the client device and/or the physical size of a display of the client device as well as characteristics of the display, such as resolution, whether the display is touch screen, etc. For example, with regard to FIGS. 1A-1B, client device 105 may determine the size of display 106 (such as retrieving the measurements from memory 109).

At 307, the client device populates the overview panel based on the generated cards. At 308, the client device displays the generated overview panel based on the determined size of the display, which is discussed further with regard to FIGS. 4A-4C below.

Figure 4A:
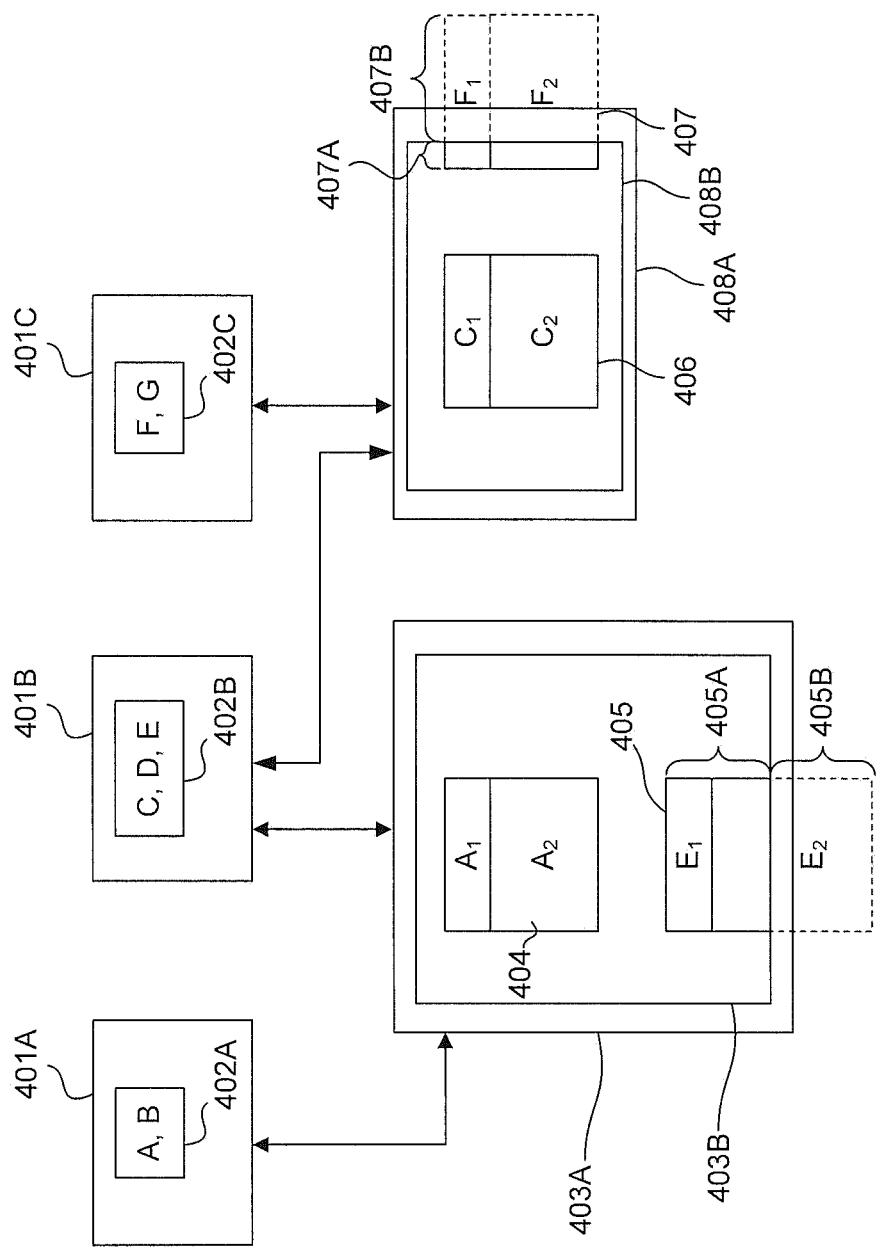
FIGS. 4A-4C are illustrations of an exemplary distributed system for displaying the overview panel, according to some embodiments.
Figure 4B:
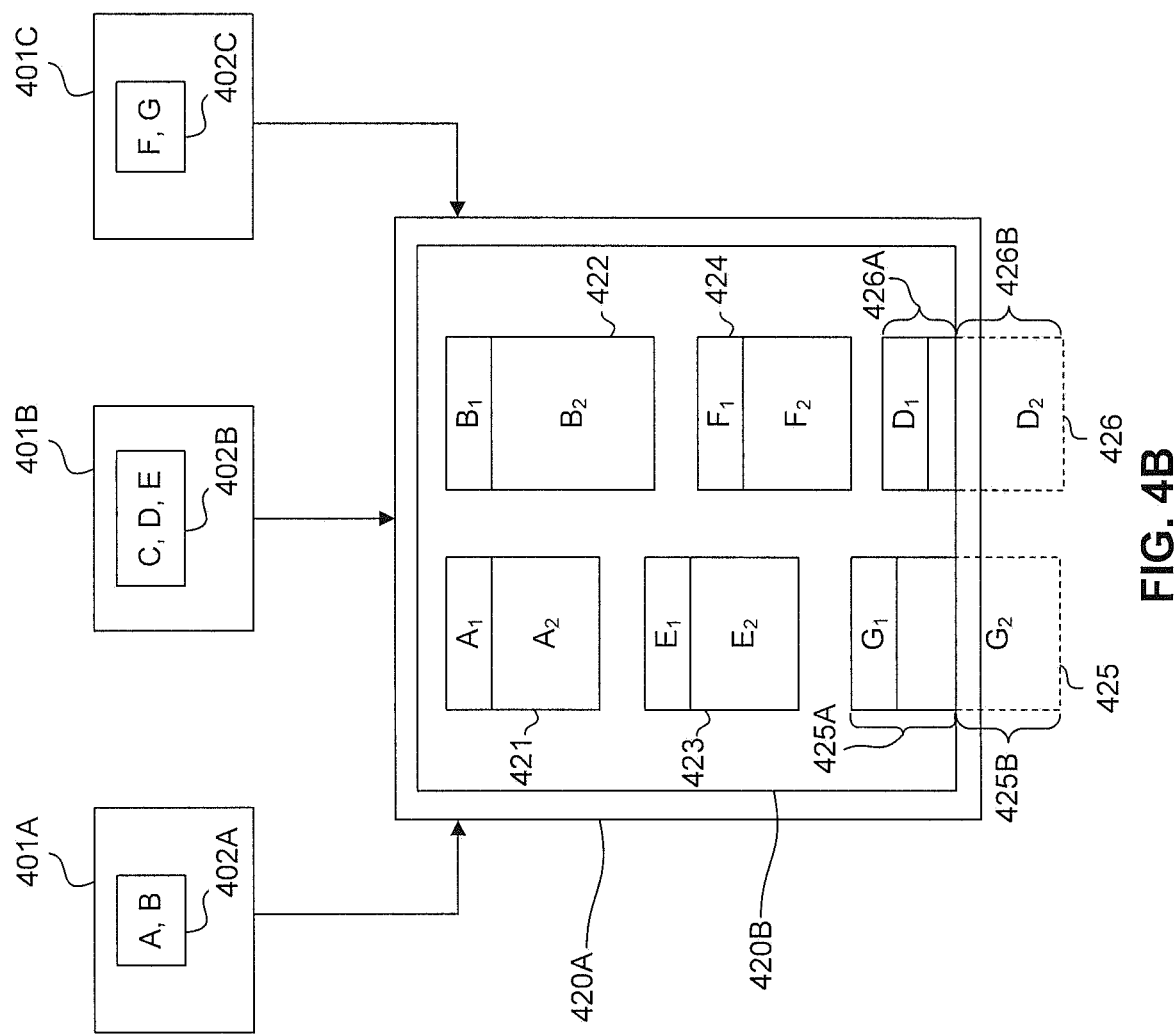
Figure 4C:
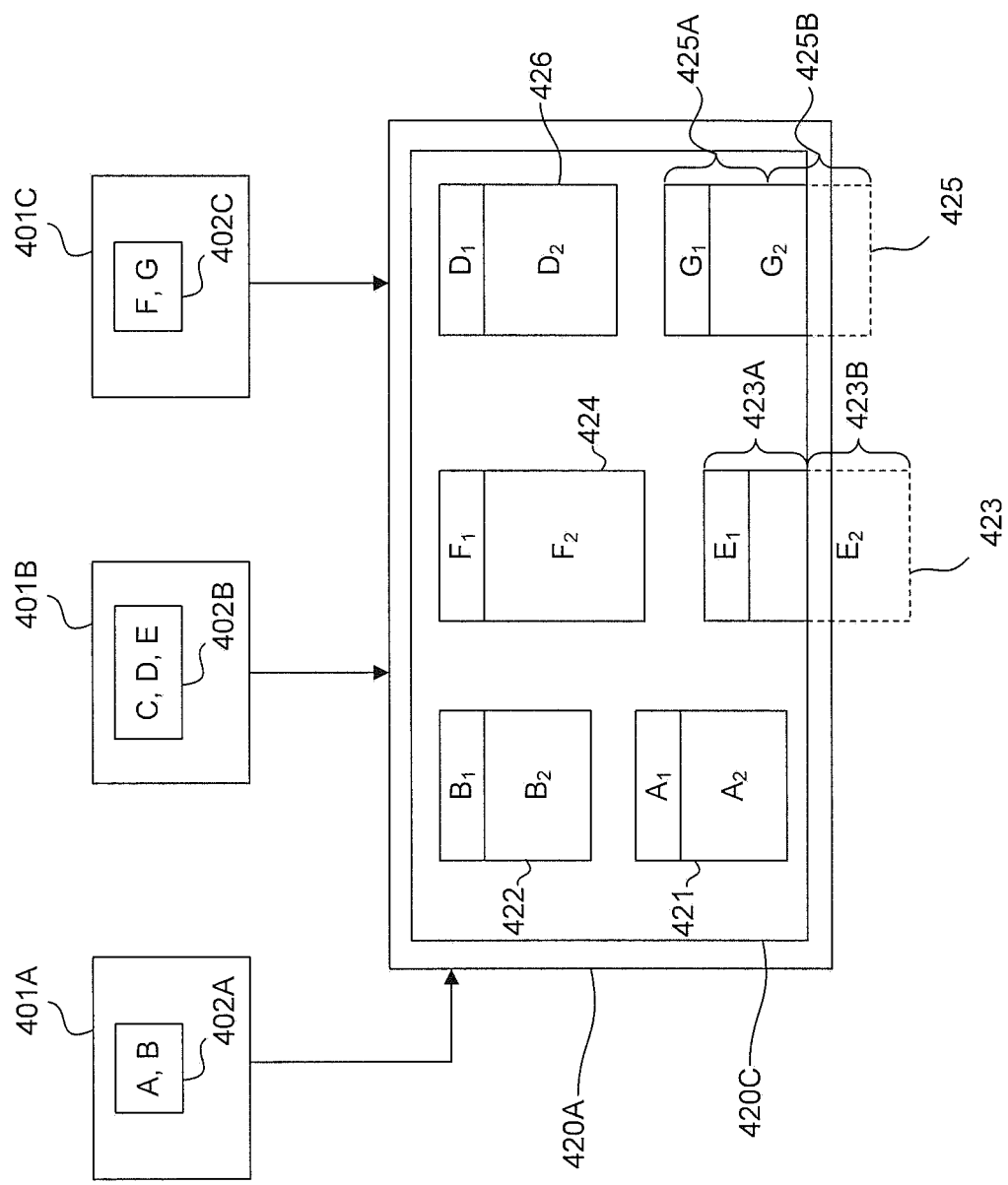

FIGS. 4A-4C are illustrations of an exemplary distributed system for displaying the overview panel based on the type of device, according to some embodiments. FIG. 4A illustrates client devices 403A and 408A, which in some embodiments, may be implemented as devices having limited display size (e.g., under 7 inches for example) such as smartphones or smart watches. Data source 401A is the source for content 402A, data source 401B is the source for content 402B, and data source 401C is the source for content 402C. Client device 403A is oriented such that its display displays overview panel 403B in portrait view. Client device 408A is oriented such that its display displays overview panel 408B in landscape view.

In some embodiments, a user of client device 403A has a role and/or domain that is associated only with content A from content 402A in data source 401A and content E from content 402B from content source 401B. Accordingly, overview panel 403B displays content A and content E for the user in the manner described above with respect to FIGS. 2 and 3. As explained above, overview panel 403B organizes content A, which includes sub-content $A_1$ and sub-content $A_2$, as card 404 and content E, which includes sub-content $E_1$ and sub-content $E_2$, as card 405. In an embodiment, client device 403A may have limited display size and therefore, overview panel 403B may dynamically organize cards 404 and 405 in a single column based on client device 403A being oriented in portrait mode. In this format, client device 403A may not have enough display size to fully display the cards in a single screen. Accordingly, only first portion 405A of card 405 may be displayed while second portion 405B remains off-screen but accessible once the user navigates to that section of the overview panel, by for example, scrolling down. A user interface controller (not shown) of client 403A may also dynamically reconfigure overview panel 403B based on any changes in orientation of client device 403A, such as if client device 403A rotates from portrait view to landscape view, which is discussed further below.

In some embodiments, a user of client device 408A has a role and/or domain that is associated only with content C from data source 401B and content F from data source 401C. Accordingly, overview panel 408B displays content C and content F for the user in the manner described above with respect to FIGS. 2 and 3. As explained above, overview panel 408B organizes content C, which includes sub-content $C_1$ and sub-content $C_2$, as card 406 and content F, which includes sub-content $F_1$ and sub-content $F_2$, as card 407. In an embodiment, client device 408A may have limited display size and therefore, overview panel 408B dynamically organizes cards 406 and 407 in a single row based on client device 403B being oriented in landscape mode. In this format, client device 403A may not have enough display size to fully display the cards in a single screen. Accordingly, only first portion 407A of card 407 is displayed while second portion 407B remains off-screen but accessible once the user navigates to that section of the overview panel, by for example, scrolling to the right. A user interface controller (not shown) of client 408A may also dynamically reconfigure overview panel 408B based on any changes in orientation of client device 408A, such as if client device 408A rotates from landscape view to portrait view.

In some embodiments, client devices 403A, 408A may only be capable of displaying overview panel in one view; in other words, client devices 403A, 408A may not be capable of displaying content in both portrait and landscape view. As a non-limiting example, client devices may be implemented as a smart watch.

FIG. 4B illustrates client device 420A, which in some embodiments, may implemented as a device having a display size larger than client devices 403A and 408A (e.g., greater than 7 inches for example), such as tablets, laptops, and desktops. FIG. 4B illustrates client device 420A in portrait view. Data source 401A is the source for content 402A, data source 401B is the source for content 402B, and data source 401C is the source for content 402C. Client device 420A is oriented such that its display displays overview panel 420B in portrait view. In some embodiments, a user of client device 420A has a role and/or domain that is associated with content A and content B from content 402A in data source 401A, content D and content E from content 402B in data source 402B, and content F and content G from content 402C in content source 401C.

Accordingly, overview panel 420B displays content A, content B, content D, content E, content F, and content G for the user in the manner described above with respect to FIGS. 2 and 3. As explained above, overview panel 420B organizes and displays content A, which includes sub-content $A_1$ and sub-content $A_2$, as card 421, content B, which includes sub-content $B_1$ and sub-content $B_2$, as card 422, content D, which includes sub-content $D_1$ and sub-content $D_2$, as card 426, content E, which includes sub-content $E_1$ and sub-content $E_2$, as card 423, content F, which includes sub-content $F_1$ and sub-content $F_2$, as card 424, and content G, which includes sub-content $G_1$ and sub-content $G_2$, as card 425.

In an embodiment, client device 420A dynamically organizes cards 421-426 in a two column format based on client device 420A being oriented in portrait mode. In this format, client device 403A may not have enough display size to fully display cards 421-426 in a single screen. Accordingly, only first portion 425A of card 425 is displayed while second portion 425B remains off-screen but accessible once the user navigates to that section of overview panel 420B, by for example, scrolling down. Similarly, first portion 426A of card 426 is displayed while second portion 426B remains off-screen but accessible once the user navigates to that section of overview panel 420B. A user interface controller (not shown) of client 403A may also dynamically reconfigure overview panel 403B based on any changes in orientation of client device 403A, such as if client device 403A rotates from portrait view to landscape view, which is discussed further with respect to FIG. 4C.

FIG. 4C illustrates client device 420A in landscape view. In an embodiment, a user interface controller (not shown) of client device 420A may receive an indication that client device 420A has transitioned from portrait view to landscape view and dynamically reconfigures overview panel 420B (as illustrated in FIG. 4B) into overview panel 420C to take advantage of the different screen configuration. In another embodiment, the user interface controller of client device 420A may receive an indication that client device is in portrait view and dynamically generates overview panel 420C based on the indication.

Similar to overview panel 420B, overview panel 420C displays cards 421-426. However, overview panel 420C displays cards 421-426 in a three-column format to take advantage of landscape view of client device 420A. This configuration is merely exemplary, and additional columns in the overview panel are within the scope of this disclosure. In this embodiment, overview panel 420C cannot not fully display cards 423 and 425. Accordingly, only first portion 423A of card 423 is displayed while a second portion 423B remains off-screen but accessible once the user navigates to that section of overview panel 420C, by for example, scrolling down. Similarly, a first portion 425A of card 425 is displayed while a second portion 425B remains off-screen but accessible once the user navigates to that section of overview panel 420C. In another embodiment, off-screen portions of cards may be viewed by scrolling to the right or left.

Figure 5:
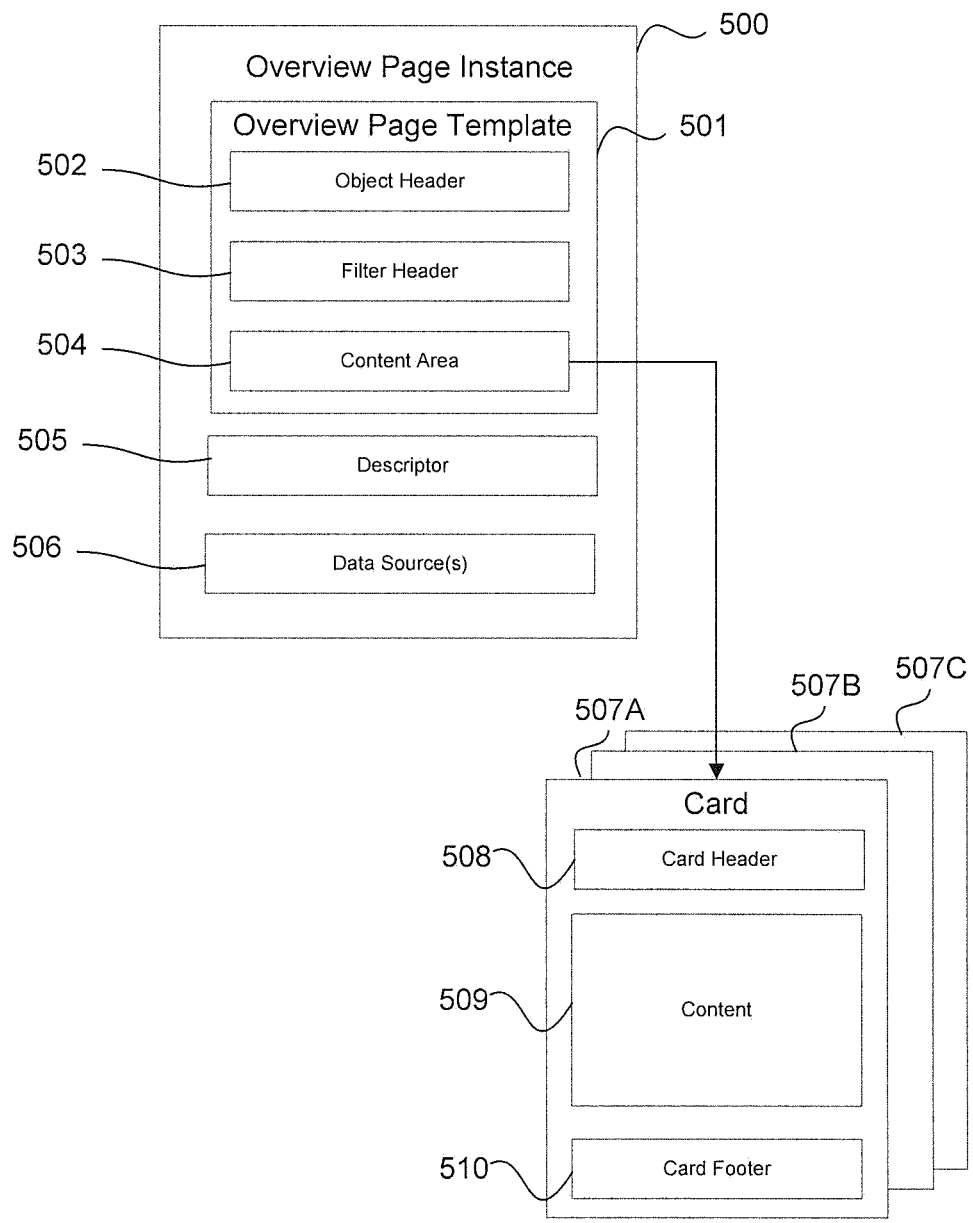
FIG. 5 is an example implementation of an overview panel, according to some embodiments.

FIG. 5 is an illustration of an implementation of an overview panel, according to some embodiments. In some embodiments, an overview panel may be generated from an overview panel instance 500 which includes overview panel template 501 which provides a template for generating overview panels. Overview panel template 501 includes object header 502, filter header 503, and content area 504. Object header 502 is a component of overview panels that may describe the domains associated with the overview panel and/or general actions that may be performed for the overview panel. Filter header 503 is a component of overview panels that provide global filters that affect some or all cards within the overview panel. Any changes to filters in filter header 503 may result in reconfiguring the overview panel consistent with the parameters of the filters. Because filter header 503 affects some or all cards within the overview panel, and cards display content from multiple data sources, filter header 503 provides a user a central location for filtering content that comes from multiple data sources.

Content area 504 is a designated area of overview panels for displaying generated cards. Overview panel instance 500 may further include descriptor 505 and data source(s) 506. Descriptor 505 may refer to the configuration and properties of overview panel that affect object header 502, filter header 503, and content area 504. Data source(s) 506 identify the data sources that provide the content of overview panel. Content area 504 is area designated for displaying cards, such as cards 507A-507C. As described above, each card may include card header 508, content 509, and card footer 510.

Figure 6:
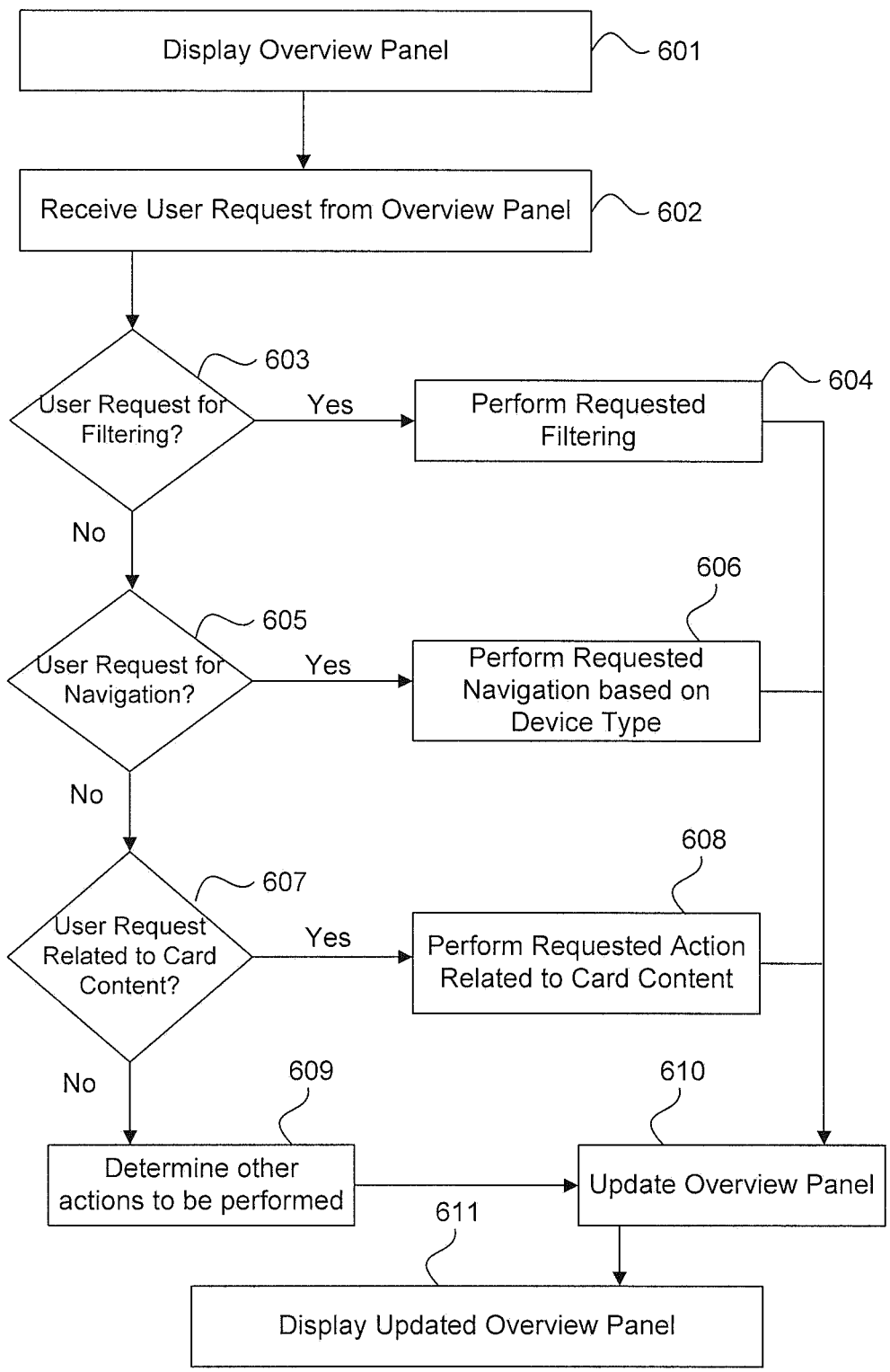
FIG. 6 is a flowchart for a method for updating an overview panel based on a user request, according to some embodiments.

FIG. 6 is a flowchart for a method 600 for updating an overview panel based on a user request, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

In some embodiments, a client device, such as client device 105 may execute method 600. More specifically, a user interface component within the client device, such as UI controller 108 within client device 105, may be responsible for performing steps associated with generating the overview panel.

At 601, a client device displays an overview panel. At 602, the client device receives a user request based on the user's interaction with the displayed overview panel. At 603, the client device determines whether the user request is for a filtering action. For example, the user may have interacted with a filter header of overview panel. As non-limiting examples, filtering actions may include specifying criteria of cards to be displayed and specifying criteria of cards to be removed. For example, a user may specify that the overview panel only display or restrict cards from certain data sources, display or restrict cards of certain content types, and/or display or restrict cards based on urgency and/or priority. If the user request is for a filtering action, then at 604, the client device performs the requested filtering of cards in the overview panel and proceeds to 610, which is discussed in detail below.

If the user request is not for a filtering action, then at 605, the client device determines whether the user request relates to navigating the overview panel. For example, a user may be scrolling up and down or left and right on the overview panel. In some embodiments, scrolling of the overview panel requires determining whether cards in the overview panel should be updated. As described with regard to FIGS. 4A-4C, the client device may determine which cards (or sections thereof) should be displayed or not displayed based on the available display size of the client device. If the user request relates to navigating the overview panel, then at 606, the client device performs the requested navigation of cards in the overview panel and proceeds to 610, which is discussed in detail below.

If the user request does not relate to navigating the overview panel, then at 607, the client device determines whether the user request relates to card content. For example, the user may be selecting an action or actions provided by a header or footer of a card. As described above, in some embodiments, the header of the card provides a description of the content of the card as well as access to the specific data source that provided the content. Selection of a header action may therefore cause the client device to navigate from the overview panel to the data source. For example, if the data source is an application, selection of the header action may cause launching of the application for further viewing of the content. As described above, in some embodiments, the footer of the card provides additional contextual actions based on the content of the card. For example, if the content is a listing of emails, available actions provided in the footer may be responding, forwarding, or deleting a selected email. If the user request relates to card content, then at 608, the client device performs the request action and proceeds to 610, which is discussed further below.

At 609, if the user request is related to other actions beside filtering, navigation, or card content, the client device performs the requested action. Non-limiting examples of such actions may include modifying the size of the cards, modifying the appearance of the cards, and/or reordering the cards in the overview panel.

At 610, the client device updates the overview panel based on results of 604, 606, and/or 608. At 611, the client device displays the updated overview panel.

Figure 7:
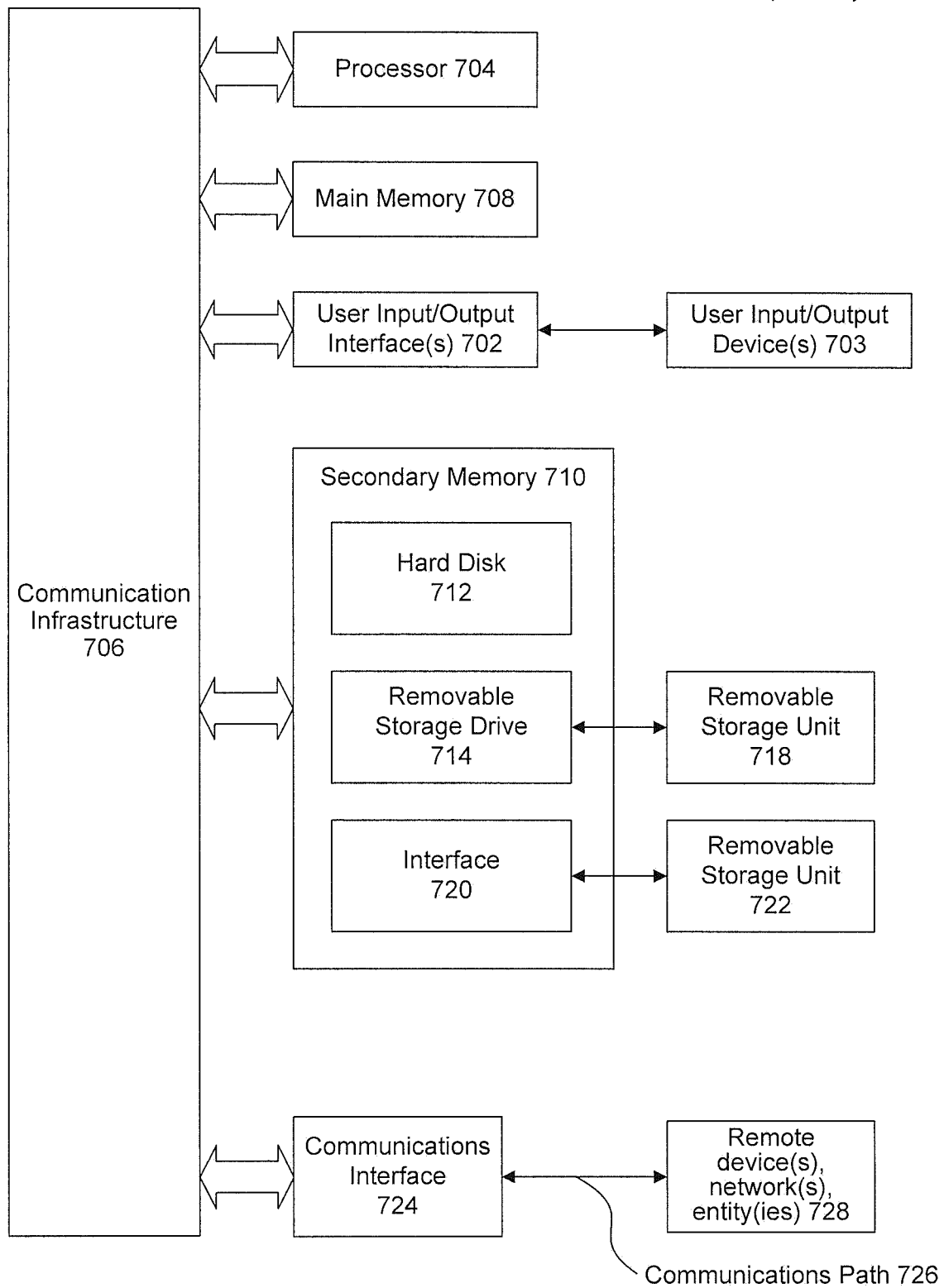
FIG. 7 is an example computer system useful for implementing various embodiments.

FIG. 7 is an example computer system useful for implementing various embodiments. Various embodiments can be implemented, for example, using one or more computer systems, such as computer system 700 shown in FIG. 7. Computer system 700 can be used, for example, to implement method 200 of FIG. 2, method 300 of FIG. 3, and/or method 6 of FIG. 6. Computer system 700 can be any computer capable of performing the functions described herein. Computer system 700 can be any well-known computer capable of performing the functions described herein.

Computer system 700 includes one or more processors (also called central processing units, or CPUs), such as a processor 704. Processor 704 is connected to a communication infrastructure or bus 706. One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those skilled in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive. In addition, in the foregoing Detailed Description, various features may be grouped or described together for the purpose of streamlining the disclosure. This disclosure is not to be interpreted as reflecting an intention that all such features are required to provide an operable embodiment.

What is claimed is:

1. A computer-implemented method, comprising:
   determining a user role associated with a user of a client device and a domain of the user of the client device, wherein the user role is categorized into the domain and the domain represents a group within an organizational structure, and wherein the user role is associated with a first permission and the domain is associated with a second permission;
   generating an overview panel based on the user role and the domain, wherein generating the overview panel includes:
      accessing a first data source based on the first permission and a second data source based on the second permission;
      retrieving, based on the accessing, first content from the first data source and second content from the second data source, wherein the first content comprises first sub-content and second sub-content and wherein the first sub-content is associated with first metadata and the second sub-content is associated with second metadata;
      determining a first display property of the first content;
      determining a second display property of the second content;
      generating a first user interface element based on the first content and the first display property by populating a first section of the first user interface element with the first sub-content based on at least the first metadata and a second section of the first user interface element based on at least the second metadata, wherein the first section of the first user interface element is designated to display a content type and the second section of the first user interface element is designated to display contextual information associated with the content type;
      generating a second user interface element based on the second content and the second display property; and
      populating the overview panel based on the first user interface element and the second user interface element; and
   displaying the overview panel in a display of the client device.

2. The computer-implemented method of claim 1, wherein the second sub-content is configured to display the contextual information, wherein the contextual information specifies an action to be performed based on the first sub-content.

3. The computer-implemented method of claim 1, wherein the second content comprises third data, fourth data, and fifth data, and generating the second user interface element comprises populating a first section of the second user interface element with the third data, populating a second section of the second user interface element with the fourth data, and populating a third section of the second user interface element with the fifth data.

4. The computer-implemented method of claim 1, wherein the first data source is an application located in a remote device different from the client device and the second data source is a server.

5. The computer-implemented method of claim 1, further comprising:
   determining that the user role and the domain further indicate a third data source;

receiving third content from the third data source;
determining a third display property of the third content;
generating a third user interface element based on the third content and the third display property; and
populating the overview panel based on the first user interface element, the second user interface element, and the third user interface element.

6. The computer-implemented method of claim 1, wherein receiving first content from a first data source and second content from a second data source comprises pulling, from the first data source, the first content to the client device and pulling, from the second data source, the second content to the client device.

7. The computer-implemented method of claim 1, wherein the first section of the first user interface element comprises a content area for displaying the first sub- content and the second section of the first user interface element for displaying the second sub- content.

8. The computer-implemented method of claim 1, wherein the content type comprises an email and wherein the contextual information comprises at least one of responding to the email, forwarding the email, or deleting the email.

9. An apparatus, comprising:
a display; and
a processor configured to:
   determine a user role associated with a user of a client device and a domain associated with the user of the client device, wherein the user role is categorized into the domain and the domain represents a group within an organizational structure, and wherein the user role is associated with a first permission and the domain is associated with a second permission;
   generate an overview panel based on the user role and the domain, wherein to generate the overview panel the processor is configured to:
      access a first data source based on the first permission and a second data source based on the second permission;
      retrieve, based on the accessing, first content from the first data source and second content from the second data source, wherein the first content comprises first sub-content and second sub-content and wherein the first sub-content is associated with first metadata and the second sub-content is associated with second metadata;
      determine a first display property of the first content;
      determine a second display property of the second content;
      generate a first user interface element based on the first content and the first display property by populating a first section of the first user interface element with the first sub-content based on at least the first metadata and a second section of the first user interface element with the second sub-content based on at least the second metadata, wherein the first section of the first user interface element is designated to display a content type and the second section of the first user interface element is designated to display contextual information associated with the content type;
      generate a second user interface element based on the second content and the second display property;
      populate the overview panel based on the first user interface element and the second user interface element; and
      configure the overview panel based on a user request by filtering, based on a display criteria included in the user request, the first permission including the user role, and the second permission including the domain, the first user interface element and the second user interface element, and wherein the display criteria specifies at least one of an allowed data source, a restricted data source, or allowed content types and prioritizing, based on a priority criteria included in the user request, an order of for displaying the first user interface element and the second user interface element in the overview panel, wherein filtering the first user interface element and the second user interface element includes adding or removing the first user interface element and the second user interface element from the overview panel based on the allowed data source, the restricted data source, or the allowed content types; and
      display the configured overview panel.

10. The apparatus of claim 9, wherein the second sub-content is configured to display the contextual information specifies an action to be performed based on the first sub-content.

11. The apparatus of claim 9, wherein the second content comprises third sub-content, fourth sub-content, and fifth sub-content, and generating the second user interface element comprises populating a first section of the second user interface element with the third sub-content, populating a second section of the second user interface element with the fourth sub-content, and populating a third section of the second user interface element with the fifth sub-content.

12. The apparatus of claim 9, wherein the first data source is an application located in a remote device different from the client device and the second data source is a server.

13. The apparatus of claim 9, wherein the processor is further configured to:
determine that user role and the domain further indicate a third data source;
receive third content from the third data source;
determine a third display property of the third content;
generate a third user interface element based on the third content and the third display property; and
populate the overview panel based on the first user interface element, the second user interface element, and the third user interface element.

14. The apparatus of claim 9, wherein to receive first content from a first data source and second content from a second data source, the processor is further configured to pull, from the first data source, the first content to the client device and pull, from the second data source, the second content to the client device.

15. The apparatus of claim 9, wherein the first display property specifies a first size of the first user interface element wherein the first size depends on the content type and the second display property specifies a second size of the second user interface element wherein the second size depends on a second content type of the second content.

16. A non-transitory computer-readable device having instructions stored thereon that, when executed by at least one computing device, causes the at least one computing device to perform operations comprising:
determining a user role associated with a user of a client device and a domain associated with the user of the client device, wherein the user role is categorized into the domain and the domain represents a group within an organizational structure, and wherein the user role is associated with a first permission and the domain is associated with a second permission;

generating an overview panel based on the user role and the domain, wherein generating the overview panel includes:

accessing a first data source based on the first permission and a second data source based on the second permission;

receiving, based on the accessing, first content from the first data source and second content from the second data source, wherein the first content comprises first sub-content and second sub-content and wherein the first sub-content is associated with first metadata and the second sub-content is associated with second metadata;

determining a first display property of the first content;

determining a second display property of the second content;

generating a first user interface element based on the first content and the first display property by populating a first section of the first user interface element with the first sub-content based on at least the first metadata and a second section of the first user interface element with the second sub-content based on at least the second metadata, wherein the first section of the first user interface element is designated to display a content type and the second section of the first user interface element is designated to display contextual information associated with the content type;

generating a second user interface element based on the second content and the second display property;

populating the overview panel based on the first user interface element and the second user interface element; and configuring the overview panel based on a user request by prioritizing, based on a priority criteria included in the user request, an order of the first user interface element and the second user interface element in the overview panel; and displaying the configured overview panel.

17. The non-transitory computer-readable medium of claim 16, wherein the second sub-content includes the contextual information to be performed based on the second content.

18. The non-transitory computer-readable medium of claim 17, wherein the second content comprises third sub-content, fourth sub-content, and fifth sub-content, and generating the second user interface element comprises populating a first section of the second user interface element with the third sub-content, populating a second section of the second user interface element with the fourth sub-content, and populating a third section of the second user interface element with the fifth sub-content.

19. The non-transitory computer-readable medium of claim 15, wherein the first data source is an application located in a remote device different from the client device and the second data source is a server.

20. The non-transitory computer-readable medium of claim 19, the operations further comprising:

determining that the user role and the domain further indicates a third data source;

receiving third content from the third data source;

determining a third display property of the third content;

generating a third user interface element based on the third content and the third display property; and populating the configured overview panel based on the first user interface element, the second user interface element, and the third user interface element.

* * * * *